(12) United States Patent
Yamada et al.

(10) Patent No.: US 12,145,210 B2
(45) Date of Patent: Nov. 19, 2024

(54) ELECTRIC DISCHARGE MACHINE

(71) Applicant: Sodick Co., Ltd., Kanagawa (JP)

(72) Inventors: Kuniharu Yamada, Kanagawa (JP);
Yoshiki Endo, Kanagawa (JP);
Tomohito Hanawa, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 732 days.

(21) Appl. No.: 17/338,675

(22) Filed: Jun. 4, 2021

(65) Prior Publication Data

US 2022/0063008 A1 Mar. 3, 2022

(30) Foreign Application Priority Data

Sep. 3, 2020 (JP) .................................. 2020-147952

(51) Int. Cl.
*B23H 1/02* (2006.01)
*G05F 1/46* (2006.01)

(52) U.S. Cl.
CPC ............... *B23H 1/022* (2013.01); *G05F 1/46* (2013.01)

(58) Field of Classification Search
CPC . B23H 1/022; B23H 7/02; B23H 7/20; B23H 1/00; B23H 1/02; B23H 11/00; G05F 1/46
See application file for complete search history.

(56) References Cited

U.S. PATENT DOCUMENTS

| | | | | |
|---|---|---|---|---|
| 2,837,662 | A * | 6/1958 | Ehret | ........................ G05F 1/46 327/530 |
| 7,528,340 | B2 | 5/2009 | Yoneda et al. | |
| 2001/0027749 | A1 | 10/2001 | Kinbara | |
| 2006/0054600 | A1 | 3/2006 | Satou et al. | |
| 2013/0300623 | A1 * | 11/2013 | Griffitts | .................... H01Q 1/10 343/792 |
| 2015/0246403 | A1 * | 9/2015 | Yamada | ................... B23H 7/04 219/69.12 |

(Continued)

FOREIGN PATENT DOCUMENTS

| | | |
|---|---|---|
| CN | 107790833 | 3/2018 |
| CN | 110856880 | 3/2020 |
| WO | 0054920 | 9/2000 |

OTHER PUBLICATIONS

"Office Action of India Counterpart Application", issued on Mar. 11, 2022, p. 1-p. 4.

*Primary Examiner* — Dana Ross
*Assistant Examiner* — Kuangyue Chen
(74) *Attorney, Agent, or Firm* — JCIPRNET

(57) ABSTRACT

An electric discharge machine includes a DC power supply, a main switching element, a polarity switching circuit, a pulse generator, a detector, and a discharge controller. The DC power supply supplies a current to a machining gap. The pulse generator switches the main switching element and one of a positive switching element and a reverse switching element of the polarity switching circuit at a predetermined switching frequency. The detector detects an interpolar voltage in the machining gap. The discharge controller includes a storage that stores a coefficient indicating a removal quantity per discharge count for each operation pattern, and a calculator that calculates the discharge count from the interpolar voltage and estimates the removal quantity from the discharge count and the coefficient according to the operation patterns.

5 Claims, 7 Drawing Sheets

(56) References Cited

U.S. PATENT DOCUMENTS

| 2015/0332809 A1* | 11/2015 | Natoli | H01R 9/05 |
| | | | 29/860 |
| 2018/0056421 A1 | 3/2018 | Furuta et al. | |
| 2018/0200815 A1* | 7/2018 | Matsunaga | B23H 7/20 |

* cited by examiner

ELECTRIC DISCHARGE MACHINE

CROSS-REFERENCE TO RELATED APPLICATION

This application claims the priority benefits of Japanese application No. 2020-147952, filed on Sep. 3, 2020. The entirety of the above-mentioned patent application is hereby incorporated by reference herein and made a part of this specification.

BACKGROUND

Technical Field

The disclosure relates to an electric discharge machine.

Description of Related Art

In an electric discharge machine, a workpiece is arranged to face a tool electrode with a predetermined machining gap. In other words, the workpiece and the tool electrode form the predetermined machining gap. The electric discharge machine applies a machining voltage to the machining gap to generate an electric discharge, and moves the tool electrode and the workpiece relative to each other to machine the workpiece into a desired shape with discharge energy. Hereinafter, the number of times of generating the electric discharge in the machining gap is referred to as a discharge count, and the quantity removed from the workpiece by the electric discharge is referred to as a removal quantity.

One or more switching elements are provided in series between a DC (direct current) power supply and the machining gap. By repeatedly turning on/off the switching element at a predetermined switching frequency, a voltage is applied at predetermined pulse interval, and electric discharges are repeatedly generated in the machining gap. Hereinafter, the switching element for switching on/off of the voltage supply to the machining gap is referred to as a main switching element.

In electric discharge machining, the basic machining uses the workpiece as the positive electrode and the tool electrode as the negative electrode. However, depending on the materials of the tool electrode and the workpiece, the shape to be machined or the machining process, machining using the workpiece as the negative electrode and the tool electrode as the positive electrode may be appropriate for better obtaining the required machining result. Generally, machining using the workpiece as the positive electrode and the tool electrode as the negative electrode is called straight polarity machining. Further, in contrast to straight polarity machining, machining using the workpiece as the negative electrode and the tool electrode as the positive electrode is called reverse polarity machining.

In addition, there are machining in which only one of straight polarity machining and reverse polarity machining is performed during machining, and machining in which straight polarity machining and reverse polarity machining are appropriately switched during machining. Generally, the former is called DC machining and the latter is called AC (alternating current) machining. Particularly, in AC machining, a machining method that switches straight polarity machining and reverse polarity machining for each pulse to set the apparent voltage in the machining gap during a predetermined period to 0V is called bipolarity machining. In the following, regardless of whether the machining is DC machining or AC machining (including bipolarity machining), whether the machining is straight polarity machining or reverse polarity machining is defined by whether the workpiece is the positive electrode or the negative electrode at each time. That is, an electric discharge that occurs from the application of a voltage to the machining gap to the end of the pulse interval with the workpiece as the positive electrode and the tool electrode as the negative electrode is defined as an electric discharge that occurs during straight polarity machining. Further, an electric discharge that occurs from the application of a voltage to the machining gap to the end of the pulse interval with the workpiece as the negative electrode and the tool electrode as the positive electrode is defined as an electric discharge that occurs during reverse polarity machining.

The electric discharge machine configured to be capable of switching between straight polarity machining and reverse polarity machining is provided with a polarity switching circuit for switching the polarity in an electric discharge machining circuit. In the electric discharge machining circuit that performs AC machining, a configuration that supplies an alternating current by providing a converter such as a ring core between the DC power supply and the machining gap, and a configuration that supplies an alternating current by using a changeover switch provided between the DC power supply and the machining gap are well known. Particularly, the changeover switch is formed of a plurality of switching elements capable of performing on/off operations at a high speed so that a high-frequency alternating current can be supplied when AC machining is performed by the changeover switch.

When a positive switching element to which a gate signal is supplied during straight polarity machining is turned on, the positive side of the DC power supply and the workpiece are electrically connected, and the negative side of the DC power supply and the tool electrode are electrically connected. When a negative switching element to which a gate signal is supplied during reverse polarity machining is turned on, the negative side of the DC power supply and the workpiece are electrically connected, and the positive side of the DC power supply and the tool electrode are electrically connected.

There is an unspecified time from the application of a voltage to the machining gap to the actual generation of an electric discharge. Therefore, in the electric discharge machining circuit that supplies a voltage to the machining gap repeatedly at a high frequency with a short pulse interval, if no electric discharge occurs when the switching element is on, the electric charge remaining in the machining gap may cause an electric discharge when the switching element is off.

By the way, the discharge count may be measured to control the electric discharge machining. For example, U.S. Pat. No. 7,528,340 B2 discloses an electric discharge machine configured to measure the discharge count from the voltage of the machining gap, control the relative positions of the workpiece and the tool electrode according to the discharge count, and keep the size of the machining gap constant.

SUMMARY

In the conventional electric discharge machine, the removal quantity for the control is estimated only by the discharge count. However, the removal quantity per electric discharge is a value that can fluctuate depending on the operating conditions of the electric discharge machining, and is not always the same.

For example, the operating conditions are classified into four operation patterns, which are when straight polarity machining is performed and the positive switching element is on, when straight polarity machining is performed and the positive switching element is off, when reverse polarity machining is performed and the negative switching element is on, and when reverse polarity machining is performed and the negative switching element is off. In each operation pattern, the removal quantity per electric discharge is different.

The disclosure provides an electric discharge machine capable of estimating the removal quantity more accurately according to the operation pattern of the switching elements.

According to an embodiment of the disclosure, an electric discharge machine is provided, which includes: a DC power supply that is connected in series with a machining gap formed by a workpiece and a tool electrode and supplies a current to the machining gap; a main switching element that is a switching element provided in series between the DC power supply and the machining gap; a polarity switching circuit that includes a positive switching element and a reverse switching element, wherein the positive switching element includes a switching element provided between a positive side of the DC power supply and the workpiece and a switching element provided between a negative side of the DC power supply and the tool electrode, and the reverse switching element includes a switching element provided between the negative side of the DC power supply and the workpiece and a switching element provided between the positive side of the DC power supply and the tool electrode; a pulse generator that performs straight polarity machining by switching the main switching element and the positive switching element on/off at a predetermined switching frequency in a state where the reverse switching element is off, and performs reverse polarity machining by switching the main switching element and the reverse switching element on/off at the switching frequency in a state where the positive switching element is off; a detector that is connected to the workpiece or the tool electrode and detects an interpolar voltage in the machining gap; and a discharge controller that includes a classifier, a storage and a calculator. The classifier is configured to determine an operation pattern of current machining is a first pattern that the positive switching element is on during the straight polarity machining, a second pattern that the positive switching element is off during the straight polarity machining, a third pattern that the reverse switching element is on during the reverse polarity machining, or a fourth pattern that the reverse switching element is off during the reverse polarity machining based on a command to turn on/off the main switching element. The storage stores a coefficient indicating a removal quantity per discharge count for each of the first to fourth operation patterns. The calculator calculates the discharge count from the interpolar voltage and estimates the removal quantity from a sum of multiplying the discharge count and the corresponding coefficient according to the first to fourth operation patterns.

According to the disclosure, when estimating the removal quantity from the discharge count, the coefficient indicating the removal quantity per the discharge count is changed according to the operation pattern of the switching element. Thereby, the removal quantity can be calculated more accurately.

DESCRIPTION OF THE EMBODIMENTS

Hereinafter, embodiments of the disclosure will be described with reference to the drawings. The various modifications described below may be implemented in any combination.

An electric discharge machine 1 according to the present embodiment is a wire electric discharge machine that uses a wire electrode as a tool electrode E. However, the disclosure is also applicable to a sinker electric discharge machine that uses a formed electrode, a small-hole electric discharge machine that uses a rod electrode or a pipe electrode, and other electric discharge machines.

Figure 1:
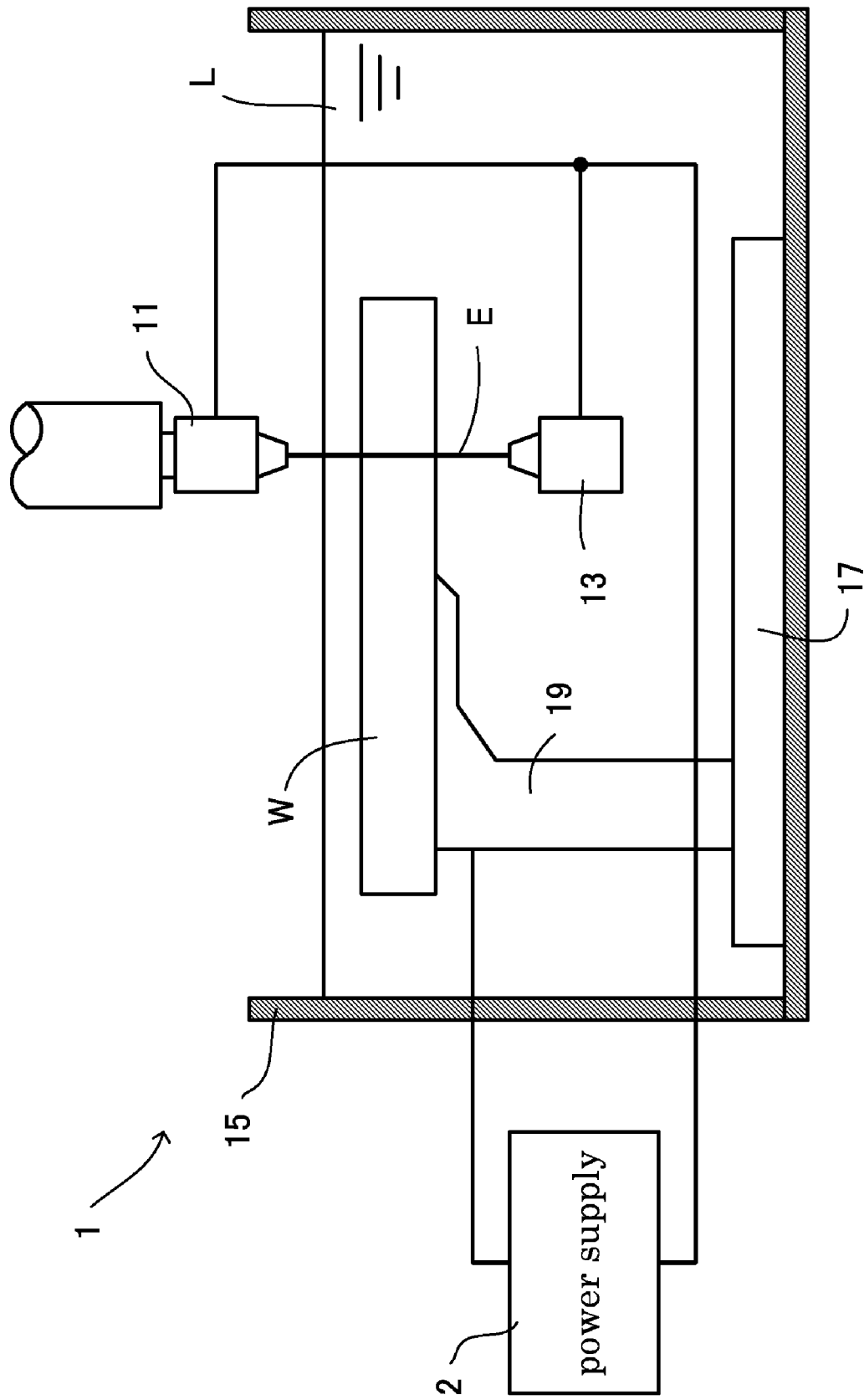
FIG. 1 is a schematic configuration view of a electric discharge machine according to the present embodiment.

As shown in FIG. 1, the electric discharge machine 1 according to the present embodiment includes an upper guide assembly 11, a lower guide assembly 13, a machining tank 15, a table 17, and a workpiece stand 19. The table 17 is provided in the machining tank 15, and the workpiece stand 19 is erected on the table 17. A workpiece W to be subjected to electric discharge machining is fixed to the workpiece stand 19 and placed in the machining tank 15 so as to be horizontally arranged. The upper guide assembly 11 and the lower guide assembly 13 are provided above and below the workpiece W, respectively. The wire electrode, which is the tool electrode E, is guided by an upper guide (not shown) in the upper guide assembly 11 and a lower guide (not shown) in the lower guide assembly 13, and is stretched vertically. During electric discharge machining, the machining tank 15 is filled with an insulating machining liquid L. The tool electrode E and the workpiece W are electrically connected to a power supply 2.

The tool electrode E is configured to be movable relative to the workpiece W. Specifically, the electric discharge machine 1 of the present embodiment includes a driver 6 including an X-axis motor 61 that moves the table 17 in an X-axis direction, which is a predetermined horizontal direction, and a Y-axis motor 63 that moves the table 17 in a Y-axis direction, which is a horizontal direction orthogonal to the X-axis. In electric discharge machining, the tool electrode E is moved relative to the workpiece W so as to be close to the workpiece W while maintaining non-contact. A gap between the workpiece W and the tool electrode E is called a machining gap.

Electric discharge machining is generally implemented in a plurality of machining steps while gradually reducing the machining allowance. The machining steps of electric discharge machining are called a rough machining step, a semi-finish machining step, and a finish machining step in descending order of the machining allowance. Since the machining condition suitable for each machining step is different, the power supply 2 of the electric discharge machine 1 may include an electric discharge machining circuit for the rough machining step, an electric discharge machining circuit for the semi-finish machining step, and an electric discharge machining circuit for the finish machining step, and may be configured so that the appropriate electric discharge machining circuit can be selected according to the progress of electric discharge machining.

Figure 2:
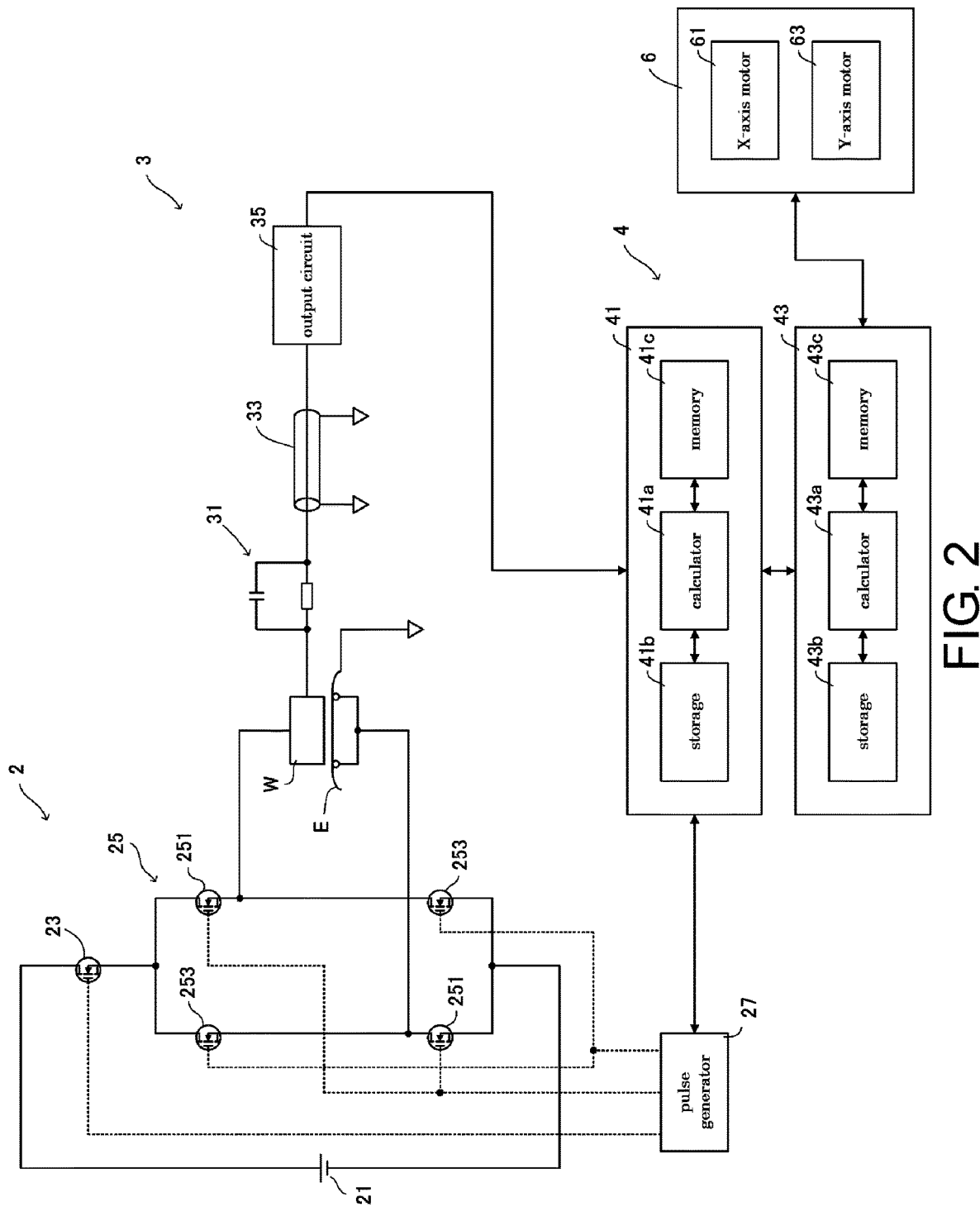
FIG. 2 is a block diagram showing a power supply, a detector, and a controller.

FIG. 2 shows an excerpt of the electric discharge machining circuit for the semi-finish machining step among the electric discharge machining circuits of the power supply 2. Further, configurations unnecessary for the description of the disclosure are omitted where appropriate. As shown in FIG. 2, the power supply 2 includes a DC power supply 21, a main switching element 23, a polarity switching circuit 25, and a pulse generator 27.

The DC power supply 21 is connected in series with the machining gap formed by the workpiece W and the tool electrode E, and supplies a current to the machining gap.

The main switching element 23 is a switching element provided in series between the DC power supply 21 and the machining gap, and switches on/off the voltage supply to the machining gap. A plurality of main switching elements 23 may be provided in parallel according to the value of the current supplied to the machining gap. The polarity switching circuit 25 is a so-called bridge circuit provided with four switching elements, and switches between straight polarity machining and reverse polarity machining. Specifically, the polarity switching circuit includes a positive switching element 251 to which a gate signal is supplied during straight polarity machining, and a reverse switching element 253 to which a gate signal is supplied during reverse polarity machining. The positive switching element 251 includes a switching element provided between the positive side of the DC power supply 21 and the workpiece W, and a switching element provided between the negative side of the DC power supply 21 and the tool electrode E. The reverse switching element 253 includes a switching element provided between the negative side of the DC power supply 21 and the workpiece W, and a switching element provided between the positive side of the DC power supply 21 and the tool electrode E. Each switching element is, for example, a field effect transistor such as a MOSFET (metal oxide semiconductor field effect transistor). When the current value running through the electric discharge machining circuit exceeds a predetermined peak current value, each switching element of the main switching element 23 and the polarity switching circuit 25 is turned off by a chopper circuit (not shown) regardless of the gate signal supplied from the pulse generator 27.

The pulse generator 27 synchronously controls the main switching element 23 and each switching element of the polarity switching circuit 25 based on a set machining condition to supply a current pulse having a waveform according to the machining condition to the machining gap. Particularly, as a current supply method, when a current pulse is supplied by a so-called multi-oscillation method in which on/off of the main switching element 23 is operated regardless of the timing at which an electric discharge occurs in the machining gap, the pulse generator 27 switches on/off the main switching element 23 and each switching element of the polarity switching circuit 25 at a predetermined switching frequency based on a gate command and a polarity designation from a computer numerical controller (CNC, not shown). Specifically, when performing straight polarity machining, the pulse generator 27 supplies a gate signal to the main switching element 23 and the positive switching element 251 at the predetermined switching frequency. As a result, in a state where the reverse switching element 253 is turned off, on/off of the main switching element 23 and the positive switching element 251 is switched at the predetermined switching frequency. Further, when performing reverse polarity machining, the pulse generator 27 supplies a gate signal to the main switching element 23 and the reverse switching element 253 at the predetermined switching frequency. As a result, in a state where the positive switching element 251 is turned off, on/off of the main switching element 23 and the reverse switching element 253 is switched at the predetermined switching frequency.

In wire electric discharge machining, the switching frequency set during the semi-finish machining step is, for example, about a few hundred kHz to 2 MHz.

When the main switching element 23, and the positive switching element 251 or the reverse switching element 253 are turned on, a predetermined voltage is applied from the DC power supply 21 to the machining gap, and after an unspecified delay time, an electric discharge is generated by dielectric breakdown. There is a case where the electric discharge is not generated during the application of the voltage to the machining gap, and the main switching element 23 and each switching element of the polarity switching circuit 25 is turned off before generation of an electric discharge. At this time, the electric charge remaining in the machining gap may cause an electric discharge when the main switching element 23, the positive switching element 251, and the reverse switching element 253 are turned off.

That is, the operation patterns of the switching elements when an electric discharge can occur are classified into four patterns, which are when the positive switching element 251 is on during straight polarity machining (hereinafter, straight polarity-ON), when the positive switching element 251 is off during straight polarity machining (hereinafter, straight polarity-OFF), when the reverse switching element 253 is on during reverse polarity machining (hereinafter, reverse polarity-ON), and when the reverse switching element 253 is off during reverse polarity machining (hereinafter, reverse polarity-OFF). In each operation pattern, the removal quantity per electric discharge is different.

As shown in FIG. 2, the electric discharge machine 1 includes a detector 3 that detects an interpolar voltage and outputs data indicating a voltage waveform in the machining gap. The detector 3 is connected to the workpiece W or the tool electrode E. The detector 3 includes an input circuit 31, a coaxial cable 33, and an output circuit 35.

The interpolar voltage in the machining gap is input to the input circuit 31, and the input circuit 31 acquires a predetermined voltage signal at a predetermined sampling frequency. The input circuit 31 includes, for example, a parallel circuit of a resistor and a capacitor provided in series between the machining gap and the coaxial cable 33.

Figure 3:
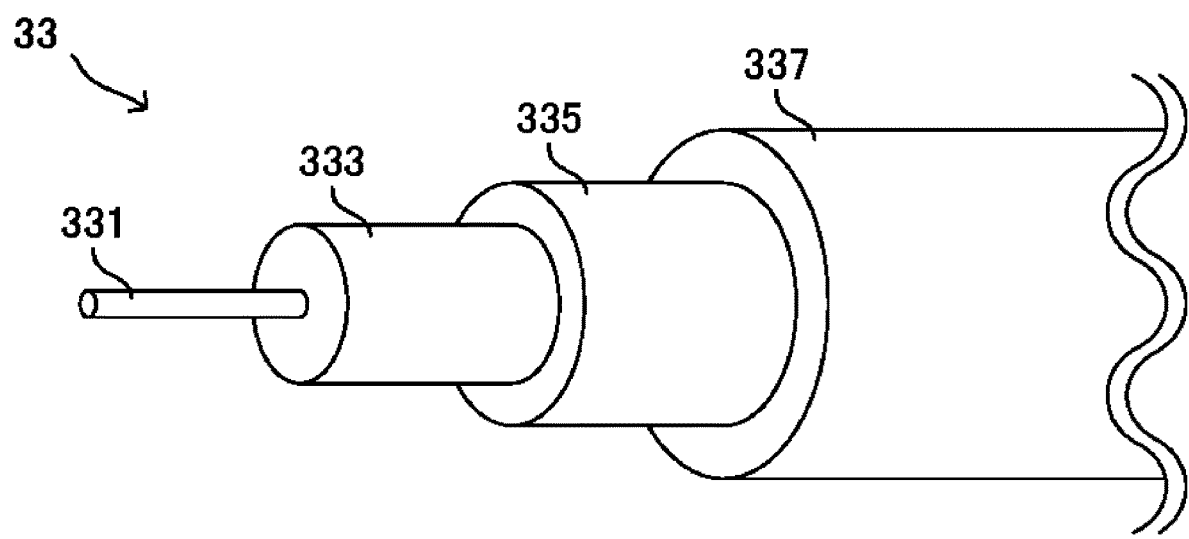
FIG. 3 is a schematic configuration view of a coaxial cable.

The coaxial cable 33 is connected in series between the workpiece W or the tool electrode E, and the output circuit 35, more specifically, between the parallel circuit of the resistor and the capacitor of the input circuit 31, and a voltage divider 351 of the output circuit 35. The coaxial cable 33 schematically shown in FIG. 3 has an inner conductor 331 which is a central axis, an insulator 333 which covers the inner conductor 331, an outer conductor 335 which covers the insulator 333, and a protective coating 337 which covers the outer conductor 335. The inner conductor 331 is connected to the input circuit 31 and the output circuit 35, and the outer conductor 335 is connected to the ground.

In a conventional coaxial cable, a material having a low volume resistivity, generally copper, is used as the inner conductor. In the semi-finish machining step and the finish machining step, the voltage waveform becomes a high frequency, so for the conventional coaxial cable that uses copper as the inner conductor, reflection of the voltage signal is likely to occur, and it is difficult to accurately detect an electric discharge. Therefore, when detecting a high-frequency voltage waveform, it is desirable to use the coaxial cable 33 that has a relatively high resistance value per 1 m of the inner conductor 331, that is, a line resistance value. The line resistance value [Ω/m] of the inner conductor 331 is obtained by dividing the volume resistivity [Ω·m] by the cross-sectional area [m²] of the inner conductor 331. Specifically, it is desirable that the line resistance value of the inner conductor 331 of the coaxial cable 33 be 30 Ω/m or more and 100 Ω/m or less. In the present embodiment, the employed coaxial cable 33 uses a Ni—Cr—Al alloy as the material of the inner conductor 331, wherein the Ni—Cr—Al alloy is composed of 19% by weight or more and 21% by weight or less of chromium, 70% by weight or more and 79% by weight or less of nickel, and more than 0% by weight of the remaining aluminum. The volume resistivity of the Ni—Cr—Al alloy is 1.28 μΩ·m or more and 1.38 μΩ·m or less. In addition, the line diameter of the inner conductor 331 is, for example, 0.18 mm. That is, the line resistivity of the inner conductor 331 of the present embodiment is about 50 Ω/m. Since such a coaxial cable 33 can suppress the reflection of the voltage signal, an electric discharge can be detected more accurately.

Figure 4:
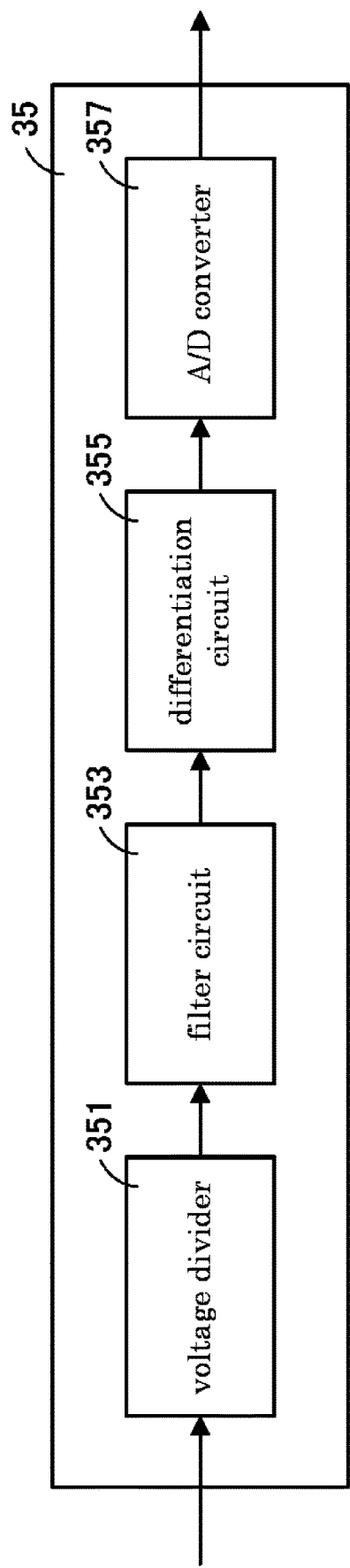
FIG. 4 is a block diagram showing the detector.

The output circuit 35 generates data of the voltage waveform in the machining gap from the voltage signal of the interpolar voltage acquired from the input circuit 31 through the coaxial cable 33, and converts the analog data of the voltage waveform to digital data and outputs the digital data of the voltage waveform. Specifically, as shown in FIG. 4, the output circuit 35 includes the voltage divider 351, a filter circuit 353, a differentiation circuit 355, and an A/D converter 357. The voltage divider 351 divides the voltage signal sent from the coaxial cable 33. The filter circuit 353 removes noise from the voltage signal sent from the voltage divider 351. The output circuit 35 acquires the voltage waveform in the machining gap based on the voltage signal of the interpolar voltage through the voltage divider 351 and the filter circuit 353. The differentiation circuit 355 amplifies the voltage signal sent from the filter circuit 353 to generate the analog data of the voltage waveform in the machining gap. The A/D converter 357 converts the analog data of the voltage waveform output from the differentiation circuit 355 at a predetermined sampling frequency (that is, clock frequency) to digital data at a higher sampling frequency and outputs the digital data of the voltage waveform. In the A/D converter 357, by changing the sampling frequency to a higher sampling frequency and generating the digital data of the voltage waveform, it is possible to detect the interpolar voltage with higher precision. For example, the detector 3 of the present embodiment converts the analog data of the voltage waveform having a sampling frequency of 10 MHz to digital data of the voltage waveform having a sampling frequency of 100 MHz. The data of the voltage waveform converted to digital data is sent to a discharge controller 41 of a controller 4.

The controller 4 includes the CNC, the discharge controller 41, and a motor controller 43. The discharge controller 41 sets data of parameters of initial electrical machining conditions in the desired preset electric discharge machining such as the polarity, peak current value (that is, average machining current value), on time (that is, pulse width or discharge time), off time (that is, pulse interval), power supply voltage, current supply method, and servo reference voltage, according to the data transferred from the CNC. Further, when the machining conditions are changed and set during electric discharge machining for various reasons, the discharge controller 41 changes and resets the data of parameters of the machining conditions that is being held. The discharge controller 41 outputs to the pulse generator 27 a command signal corresponding to the machining condition related to the current pulse among the currently held electrical machining conditions, for example, the peak current value, on time, and off time, and controls the current pulse through the pulse generator 27. In addition, the discharge controller 41 selectively outputs a command signal corresponding to the currently held machining condition to a predetermined changeover switch group provided in the electric discharge machining circuit to turn on/off the changeover switch. Furthermore, the discharge controller 41 outputs a command signal corresponding to the currently held machining condition to, for example, a variable DC power supply or a variable resistor provided in the electric discharge machining circuit to set a power supply voltage value and a resistance value. Alternatively, the discharge controller 41 outputs a command signal corresponding to the currently held machining condition to a reference input end of a comparator to set a reference value. Particularly, the discharge controller 41 of the present embodiment measures the discharge count based on the data of the voltage waveform output from the detector 3. The motor controller 43 performs servo control in the driver 6 based on the command from the CNC and the removal quantity calculated by the discharge controller 41. The motor controller 43 includes a calculator 43a that performs various calculations, a storage 43b that stores data necessary for control and calculation, and a memory 43c that temporarily stores data for calculation.

Figure 5:
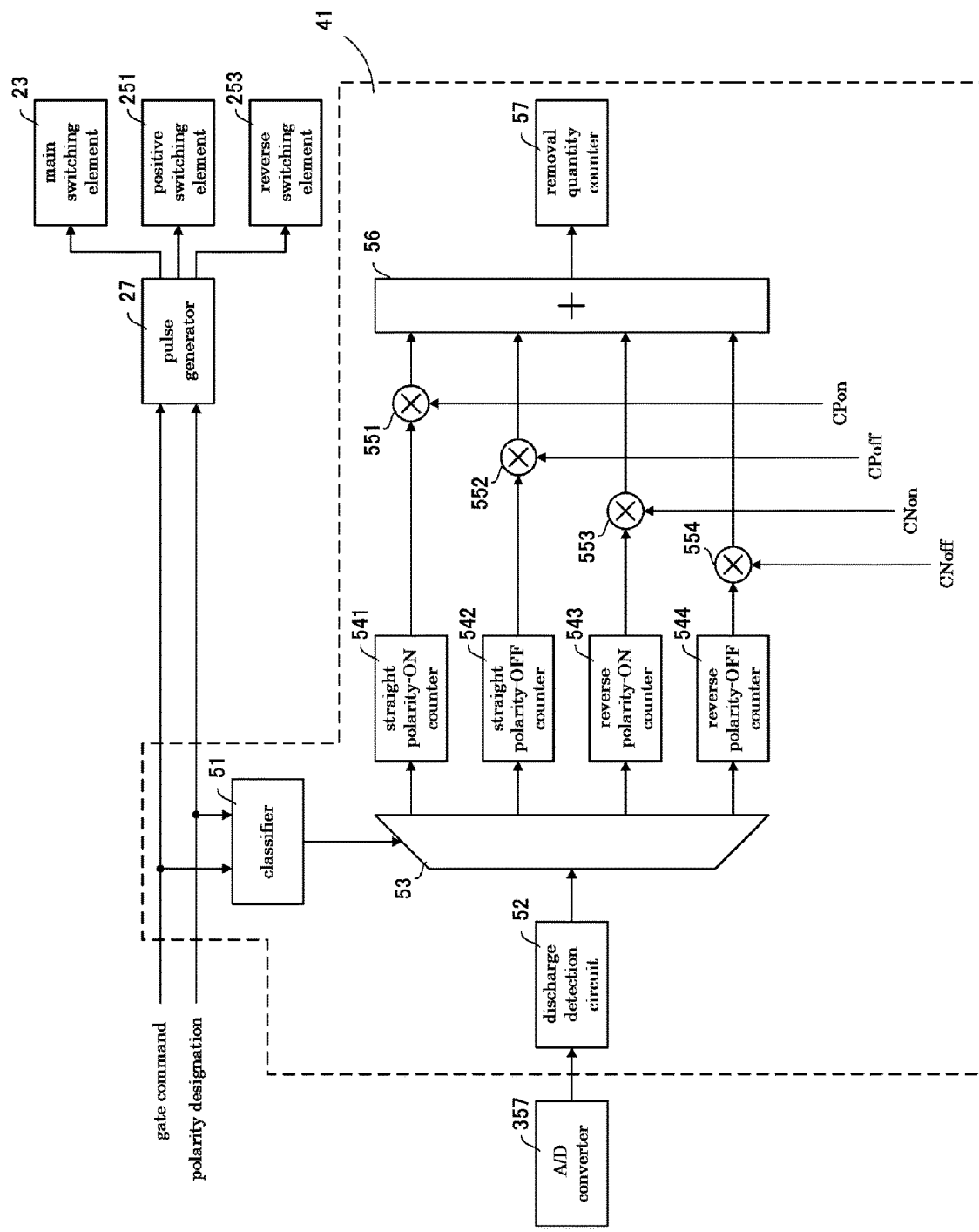
FIG. 5 is a block diagram showing a discharge controller.
Figure 6:
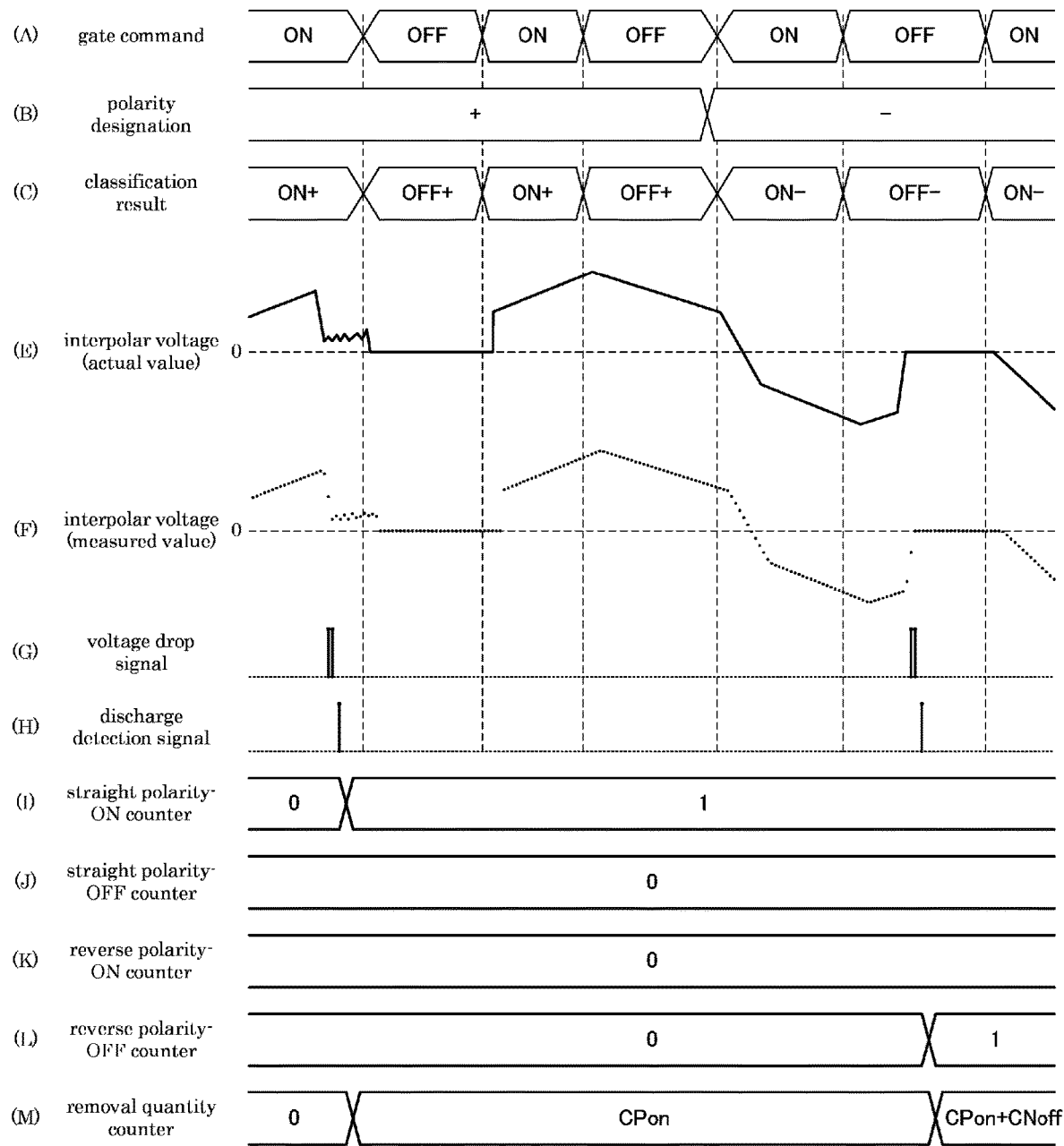
FIG. 6 is a timing chart of various signals.
Figure 7:
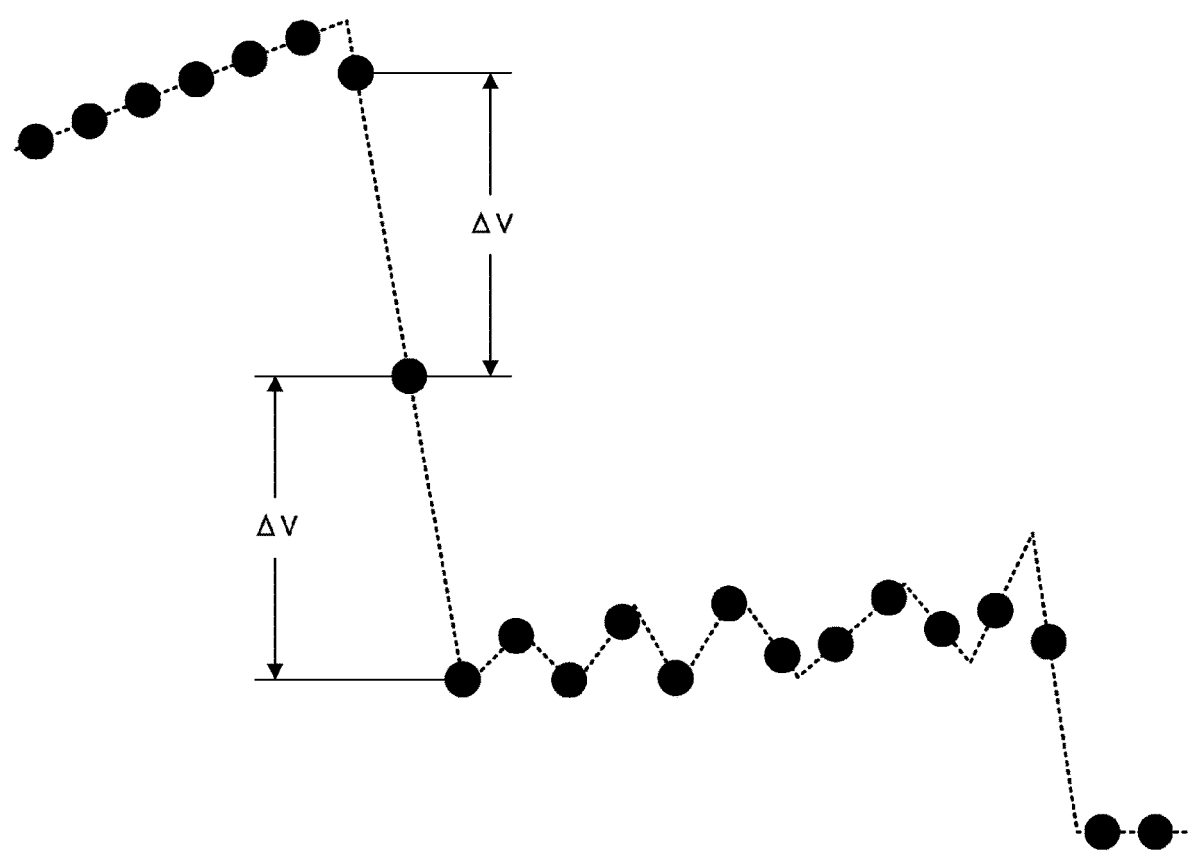
FIG. 7 is an enlarged diagram of the waveform of the interpolar voltage.

Here, a method of measuring the discharge count and calculating the removal quantity will be described in detail based on FIG. 5 to FIG. 7. As shown in FIG. 5, the discharge controller 41 includes a classifier 51, a discharge detection circuit 52, a demultiplexer 53, a straight polarity-ON counter 541, a straight polarity-OFF counter 542, a reverse polarity-ON counter 543, a reverse polarity-OFF counter 544, a multiplier 551, a multiplier 552, a multiplier 553, a multiplier 554, an adder 56, and a removal quantity counter 57. Specifically, the discharge controller 41 includes, for example, a calculator 41a that performs various calculations, a storage 41b that stores data necessary for control and calculation, a memory 41c that temporarily stores data for calculation. In other words, the discharge controller 41 includes the storage 41b that stores a coefficient indicating the removal quantity per discharge count for each of the operation patterns, that is, each of straight polarity-ON, straight polarity-OFF, reverse polarity-ON, and reverse polarity-OFF, and the calculator 41a that calculates the discharge count from the interpolar voltage and estimates the removal quantity from the discharge count and the coefficient according to the operation patterns. The calculator 41a is, for example, a programmable logic device such as an FPGA.

First, the classifier 51 determines whether the current machining is straight polarity-ON, straight polarity-OFF, reverse polarity-ON or reverse polarity-OFF based on the gate command, which is a command to turn on/off the main switching element 23, and the polarity designation, which designates straight polarity machining or reverse polarity machining, and outputs the determination result to the demultiplexer 53. As shown in (A) to (C) of FIG. 6, the classifier 51 determines the operation pattern as straight polarity-ON (ON+) when the gate command is on (ON) and the polarity designation is straight polarity machining (+), determines the operation pattern as straight polarity-OFF (OFF+) when the gate command is off (OFF) and the polarity designation is straight polarity machining (+), determines the operation pattern as reverse polarity-ON (ON−) when the gate command is on (ON) and the polarity designation is reverse polarity machining (−), and determines the operation pattern as reverse polarity-OFF (OFF−) when the gate command is off (OFF) and the polarity designation is reverse polarity machining (−).

Furthermore, the discharge detection circuit 52 detects the occurrence of an electric discharge based on the data of the voltage waveform from the A/D converter 37. (E) of FIG. 6 shows the waveform of the actual voltage of the interpolar voltage. (F) of FIG. 6 shows the waveform of the measured value of the interpolar voltage converted to digital data by the A/D converter 357. In addition, FIG. 7 enlarges a part of the waveform of the measured value of the interpolar voltage at which an electric discharge occurs. For example, the discharge detection circuit 52 outputs a voltage drop signal when the absolute value ΔV of the difference between the voltage at the predetermined sampling point and the voltage at the next sampling point becomes equal to or higher than a predetermined threshold value. Then, when the discharge detection circuit 52 outputs the voltage drop signal for two consecutive times, the discharge detection circuit 52 outputs a discharge detection signal indicating that an electric discharge has occurred to the demultiplexer 53. (G) of FIG. 6 shows the voltage drop signal, and (H) of FIG. 6 shows the discharge detection signal. In order to prevent erroneous detection of an electric discharge, the discharge detection circuit 52 may be configured not to output the voltage drop signal or the discharge detection signal until a predetermined time elapses after the polarity designation is switched from plus to minus or from minus to plus.

The demultiplexer 53 determines the operation pattern of the switching element when an electric discharge occurs, divides the discharge count for each operation pattern of the switching element, and stores it cumulatively to the straight polarity-ON counter 541, the straight polarity-OFF counter 542, the reverse polarity-ON counter 543 or the reverse polarity-OFF counter 544 until reset. Specifically, the demultiplexer 53 counts the discharge count separately for straight polarity-ON, straight polarity-OFF, reverse polarity-ON, and reverse polarity-OFF based on the classification result from the classifier 51 and the discharge detection signal of the discharge detection circuit 52, and stores the count value of the discharge count during each operation pattern in the straight polarity-ON counter 541, the straight polarity-OFF counter 542, the reverse polarity-ON counter 543 or the reverse polarity-OFF counter 544 so as to associate the discharge count during operation of each operation pattern with each operation pattern. (I), (J), (K), and (L) of FIG. 6 show the count numbers of the straight polarity-ON counter 541, the straight polarity-OFF counter 542, the reverse polarity-ON counter 543, and the reverse polarity-OFF counter 544, respectively. Specifically, in FIG. 6, it is shown that one electric discharge is generated respectively during straight polarity-ON and during reverse polarity-OFF.

Here, the value of the coefficient indicating the removal quantity per discharge count with respect to each of the operation pattern of the switching element, that is, straight polarity-ON, straight polarity-OFF, reverse polarity-ON, and reverse polarity-OFF, is stored in the storage 41b of the discharge controller 41. In the present embodiment, the coefficient CPon during straight polarity-ON is, for example, 3.22, the coefficient CPoff during straight polarity-OFF is, for example, 2.75, the coefficient CNon during reverse polarity-ON is, for example, 1.17, and the coefficient CNoff during reverse polarity-OFF is, for example, 1.00.

The above-mentioned coefficients can be estimated from the parameters of the machining conditions such as the servo reference voltage, on time, and off time using a predetermined calculation formula. Further, it is also possible to obtain and store different coefficient values in advance for predetermined machining conditions, and acquire the coefficient value corresponding to the set machining condition.

In a predetermined cycle, a signal indicating the discharge count in each operation pattern is output from the straight polarity-ON counter 541, the straight polarity-OFF counter 542, the reverse polarity-ON counter 543, and the reverse polarity-OFF counter 544, and after the discharge counts are multiplied by the corresponding coefficients CPon, CPoff, CNon, and CNoff by the multipliers 551, 552, 553, and 554, the values are added up by the adder 56. The total value is stored in the removal quantity counter 57 as an estimated value of the removal quantity in the predetermined cycle. (M) of FIG. 6 shows the count number of the removal quantity counter 57. With such a configuration, the removal quantity is calculated more accurately from the discharge count.

The specific configurations of the power supply 2, the detector 3, and the controller 4 described above are merely examples, and any configuration may be employed as long as the disclosure can be implemented. For example, in place of the pulse generator 27, the calculator 41a of the discharge controller 41 may be configured to directly output the gate signal to each switching element. In that case, the calculator 41a of the discharge controller 41 also serves as the pulse generator.

In order to detect the discharge count more accurately, it is desirable that the switching frequency of each switching element be about ⅟50 or less of the sampling frequency of the A/D converter 357. Specifically, it is desirable that when the sampling frequency of the A/D converter 357 is 100 MHz, the switching frequency be about 2 MHz or less. That is, the machining method of estimating the removal quantity from the discharge count and the coefficient according to the operation pattern described in this specification is preferably implemented during the semi-finish machining step, in which the switching frequency is often set to about 2 MHz or less and relatively high-precision machining is required. Of course, the machining method may also be implemented during the rough machining step or the finish machining step.

As described above, by calculating the removal quantity more accurately, the electric discharge machining can be controlled more accurately. For example, the motor controller 43 may control the X-axis motor 61 and the Y-axis motor 63 according to the removal quantity calculated by the discharge controller 41, and correct the relative positions of the tool electrode E and the workpiece W so as to keep the size of the machining gap constant. In this way, since the size of the machining gap is controlled to be substantially constant, a desired quantity of material can be removed from the workpiece W, and a desired level of surface roughness can be obtained.

The disclosure is not limited to the configurations of the embodiments shown in the drawings, as already specifically shown in some examples, and various modifications or applications are possible without departing from the technical idea of the disclosure.

What is claimed is:

1. An electric discharge machine, comprising:
a DC power supply that is connected in series with a machining gap formed by a workpiece and a tool electrode and supplies a current to the machining gap;
a main switching element comprising a switching transistor provided in series between the DC power supply and the machining gap;
a polarity switching circuit that comprises a positive switching element and a reverse switching element, wherein the positive switching element comprises a switching transistor provided between a positive side of the DC power supply and the workpiece and a switching transistor provided between a negative side of the DC power supply and the tool electrode, and the reverse switching element comprises a switching transistor provided between the negative side of the DC power supply and the workpiece and a switching transistor provided between the positive side of the DC power supply and the tool electrode;
a pulse generator that performs straight polarity machining by switching the main switching element and the positive switching element on/off at a predetermined switching frequency in a state where the reverse switching element is off, and performs reverse polarity machining by switching the main switching element and the reverse switching element on/off at the switching frequency in a state where the positive switching element is off;
a detector that is connected to the workpiece or the tool electrode and detects an interpolar voltage in the machining gap; and
a discharge controller that comprises:
a classifier configured to determine an operation pattern of current machining is a first pattern that the positive switching element is on during the straight polarity machining, a second pattern that the positive switching element is off during the straight polarity machining, a third pattern that the reverse switching element is on during the reverse polarity machining, or a fourth pattern that the reverse switching element is off during the reverse polarity machining based on a command to turn on/off the main switching element, and
a storage and a calculator, wherein the storage stores a coefficient indicating a removal quantity per discharge count for each of the first to fourth operation patterns, and the calculator calculates the discharge count from the interpolar voltage and estimates the removal quantity from a sum of multiplying the discharge count and the corresponding coefficient according to the first to fourth operation patterns.

2. The electric discharge machine according to claim 1, wherein the detector comprises:
an input circuit that is connected to the workpiece or the tool electrode;
a coaxial cable that is connected to the input circuit, and has an inner conductor that is a central axis, an insulator that covers the inner conductor, an outer conductor that covers the insulator, and a protective coating that covers the outer conductor; and
an output circuit that is connected to the coaxial cable and generates data of a voltage waveform in the machining gap from a voltage signal of the interpolar voltage.

3. The electric discharge machine according to claim 2, wherein a line resistance value of the inner conductor of the coaxial cable is 30 Ω/m or more and 100 Ω/m or less.

4. The electric discharge machine according to claim 2, wherein the output circuit comprises:
a voltage divider that divides the voltage signal;
a filter circuit that removes noise of the voltage signal;
a differentiation circuit that amplifies the voltage signal and generates analog data of the voltage waveform in the machining gap; and
an A/D converter that converts the analog data of the voltage waveform to digital data of the voltage waveform.

5. The electric discharge machine according to claim 1, wherein the switching frequency is 2 MHz or less.

* * * * *